United States Patent
Blömer et al.

[11] Patent Number: 6,096,807
[45] Date of Patent: *Aug. 1, 2000

[54] POWDER COATING, PROCESS FOR THE EXTERIOR COATING OF METAL PIPES, AND USE OF THE POWDER COATING FOR THE ONE-LAYER EXTERIOR COATING OF METAL PIPES

[75] Inventors: Werner Blömer, Ochtrup; Udo Reiter, Telgte, both of Germany; Josef Rademacher, Beverly Hills, Mich.

[73] Assignee: BASF Coatings AG, Muenster-Hiltrup, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,160
[22] PCT Filed: Jun. 16, 1994
[86] PCT No.: PCT/EP94/01972
  § 371 Date: Feb. 7, 1996
  § 102(e) Date: Feb. 7, 1996
[87] PCT Pub. No.: WO95/02018
  PCT Pub. Date: Jan. 19, 1995

[30] Foreign Application Priority Data

Jul. 6, 1993 [DE] Germany ............... 43 22 437

[51] Int. Cl.[7] ............... C08K 3/36; C08L 63/04
[52] U.S. Cl. ............... 523/466; 428/418; 523/208; 523/212
[58] Field of Search ............... 525/481, 523, 525/534, 934; 523/208, 212, 213, 214, 424, 425, 466; 428/35.7, 418

[56] References Cited

U.S. PATENT DOCUMENTS

| | | | |
|---|---|---|---|
| 4,036,787 | 7/1977 | Blount | 260/2 |
| 4,086,190 | 4/1978 | Blount | 528/25 |
| 4,122,060 | 10/1978 | Yallourakis | 260/37 |
| 4,994,348 | 2/1991 | Raabe et al. | 430/287 |
| 5,049,596 | 9/1991 | Fujimoto et al. | |
| 5,189,080 | 2/1993 | Heyke et al. | 523/212 |
| 5,338,434 | 8/1994 | Ruhl et al. | 205/229 |

FOREIGN PATENT DOCUMENTS

| | | | |
|---|---|---|---|
| 0 217 236 A2 | 9/1986 | European Pat. Off. | C08K 3/36 |
| 2839221 | 3/1979 | Germany . | |
| 203327 | 10/1983 | Germany . | |

OTHER PUBLICATIONS

Lee et al, "Handbook of Epoxy Resins", pp. 11–14 to 11–16, McGraw Hill, 1982.

Russian Journal, Voloshkin et al., "Epoxy powder compositions", 1981.

Lee et al, "Epoxy Resin Handbook", pp. 2–10, 1967.

Registry number 14808–60–7 the chemical names which are common, NA.

*Primary Examiner*—Robert Dawson
*Assistant Examiner*—D. Aylward

[57] ABSTRACT

Powder coating, process for the exterior coating of metal pipes, and use of the powder coating for the single-layer exterior coating of metal pipes. The powder coating comprises epoxy resins, phenolic crosslinking agents, catalysts, fillers and additives. The fillers used are crystalline silicic acids modified with glycidyl groups. The invention also relates to a process for the exterior coating of metal pipes and to use of the coatings for a single layer exterior coating of metal pipes.

6 Claims, No Drawings

POWDER COATING, PROCESS FOR THE EXTERIOR COATING OF METAL PIPES, AND USE OF THE POWDER COATING FOR THE ONE-LAYER EXTERIOR COATING OF METAL PIPES

The present invention relates to powder coatings containing epoxy resins, phenolic crosslinking agents, catalysts, fillers and, if desired, auxiliaries and additives. The invention further relates to processes for the exterior coating of metal pipes using these powder coatings, and to the use of the powder coatings for the one-layer exterior coating of metal pipes.

Nowadays, metal pipes are usually protected against corrosion by being coated with reactive powder coatings. It is known to use for this purpose powder coatings based on epoxy resins and suitable crosslinking agents. The powder coatings which are suitable for this one-layer coating process for metal pipes must meet stringent requirements with regard to protection against corrosion, hot water exposure and cathodic delamination. Powder coatings suitable for exterior coating of pipes are known, for example, from EP-B-104 719 and U.S. Pat. No. 4,122,060. The powder coatings known from EP-B-104 719 are epoxy resins which are crosslinked using, for example, phenolic curing agents. The powder coatings described also contain catalysts, and calcium oxide as filler.

U.S. Pat. No. 4,122,060 describes powder coatings based on epoxy resins, curing agents, fillers and catalysts, the filler employed preferably being amorphous silicic acids. Furthermore, it is known to employ felspars and barytes or alternatively precipitated barium sulfate as fillers in epoxy powder coatings for pipe coating.

The previously known powder coatings based on epoxy resins, suitable crosslinking agents, catalysts and fillers such as, for example, amorphous silicic acids, felspars, barytes and precipitated barium sulfates, have the disadvantage that they exhibit poor properties with respect to resistance to hot water and to cathodic delamination (DIN 30671).

The object of the present invention was therefore to eliminate the disadvantages of the prior art by providing powder coatings which are based on epoxy resins, on suitable crosslinking agents such as, for example, phenolic curing agents, on fillers and on catalysts and which are suitable for the exterior coating of metal pipes. The pipes coated with these powder coatings should have good protection against corrosion, improved resistance to hot water and improved resistance with regard to cathodic delamination. Furthermore, the coatings obtained should be of high flexibility.

The object of the invention is achieved by powder coatings comprising epoxy resins, phenolic crosslinking agents, catalysts, fillers and, if desired, auxiliaries and additives. The powder coatings are characterized in that the fillers used are crystalline silicic acid modifications which are functionalized with glycidyl groups.

Suitable epoxy resins are all solid epoxy resins having epoxide equivalent weights of between about 400 and 3000. These are predominantly epoxy resins based on bisphenol A and bisphenol F. Particular preference is given to employing epoxidized novolak resins. Also suitable are mixtures of bisphenol A or bisphenol F resins and novolak resins. The epoxy resins based on bisphenol A and bisphenol F possess, in general, a functionality<2, the epoxidized novolak resins a functionality>2. The resins used with particular preference in the powder coatings according to the invention are epoxidized novolaks having an average functionality in the range from 2.4 to 2.8 and with an epoxide equivalent weight in the range from 600 to 850. In the epoxidized novolak resins the phenolic hydroxyl groups are etherified with alkyl, aryl or similar groups. By reacting the phenolic hydroxyl groups with epichlorohydrin, epoxide groups are incorporated into the molecule. Starting from novolaks, the so-called epoxy novolak is formed in this process. The epoxidized novolaks are structurally related to bisphenol A resins. Epoxidized novolak resins can be prepared by epoxidation of novolaks consisting, for example, of from 3 to 4 phenol rings which are joined to one another via methylene bridges. The novolak resins used can also be alkyl-substituted phenols which are reacted with formaldehyde.

Examples of suitable epoxy resins are the products which are commercially available under the following names:

Epikote 154, 1001, 1002, 1055, 1004, 1007, 1009, 2014, 3003-4F-10 from Shell-Chemie, XZ 86795 and DER 664, 667, 669, 662, 642U and 672U from Dow and Araldit XB 4393, XB 4412, GT 7072, GT 7203, GT 7004, GT 7304, GT 7097, GT 7220 and GT 7255 from Ciba Geigy.

For the curing of the epoxy resins the powder coating according to the invention contains phenolic cross-linking agents. In this context, for example, any desired phenolic resin can be used provided it has the methylol functionality necessary for reactivity. Preferred phenolic resins are reaction products, prepared under alkaline conditions, of phenol, substituted phenols and bisphenol A with formaldehyde. Under these conditions the methylol group is linked to the aromatic ring either in the ortho or the para position. Particularly preferred phenolic crosslinking agents in accordance with the present invention are hydroxyl group-containing bisphenol A or bisphenol F resins having a hydroxyl equivalent weight in the range from 180 to 600, particularly preferably in the range from 180 to 300. Such phenolic crosslinking agents are prepared by reacting bisphenol A or bisphenol F with components containing glycidyl groups, for example the diglycidyl ether of bisphenol A. Such phenolic crosslinking agents are obtainable, for example, under the trade name DEH 81, DEH 82 and DEH 87 from Dow, DX 171 from Shell-Chemie and XB 3082 from Ciba Geigy.

In this context the epoxy resins and the phenolic crosslinking agents are employed in a ratio such that the number of epoxide groups to the number of phenolic OH groups is approximately 1:1.

The powder coatings according to the invention contain one or more suitable catalysts for curing the epoxy resin. Suitable catalysts are phosphonium salts of organic or inorganic acids, imidazole and imidazole derivatives, quaternary ammonium compounds and amines. The catalysts are generally employed in proportions of from 0.001% by weight to about 10% by weight, based on the total weight of the epoxy resin and of the phenolic crosslinking agent.

Examples of suitable phosphonium salt catalysts are ethyltriphenylphosphonium iodide, ethyltriphenylphosphonium chloride, ethyltriphenylphosphonium thiocyanate, the complex of ethyltriphenylphosphonium acetate with acetic acid, tetrabutylphosphonium iodide, tetrabutylphosphonium bromide and the complex of tetrabutylphosphonium acetate with acetic acid. These and other suitable phosphonium catalysts are described in, for example, U.S. Pat. No. 3,477, 990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described in, for example, Belgian Patent No. 756,693.

In some cases, commercially available phenolic crosslinking agents already contain catalysts for crosslinking the epoxy resin.

The powder coatings according to the invention are characterized in that they contain as filler crystalline silicic acid modifications functionalized with glycidyl groups. These fillers are conventionally employed in a proportion of from 10 to 50% by weight, based on the total weight of the powder coating. In some cases proportions of filler of more than 50% by weight are also possible.

The crystalline silicic acid modifications include quartz, cristobalite, tridymite, keatite, stishovite, melanophlogite, coesite and fibrous silicic acid. The crystalline silicic acid modifications are functionalized with glycidyl groups, this glycidyl-group functionalization being achieved by a surface treatment. Examples of these silicic acid modifications are those based on quartz, cristobalite and fused silica, which are prepared by treating the crystalline silicic acid modifications with epoxy silanes. The glycidyl-group functionalized silicic acid modifications are commercially available, for example, under the name Silbond® 600 EST and Silbond® 6000 EST (manufacturer: Quarzwerke GmbH).

The powder coatings according to the invention advantageously contain from 10 to 40% by weight, based on the total weight of the powder coating, of crystalline silicic acid modifications functionalized with glycidyl groups.

The powder coatings may also contain other inorganic fillers, for example titanium dioxide, barium sulfate and silicate-based fillers such as, for example, talc, kaolin, magnesium and aluminum silicates, mica and the like. In addition, the powder coatings may also, if desired, contain auxiliaries and additives. Examples of these are leveling agents, flow aids and deaerating agents, for example benzoin.

The powder coatings are prepared by known methods (cf. eg. the product information publication from BASF Lacke+Farben AG, "Pulverlacke" [Powder coatings], 1990) by homogenizing and dispersing, for example using an extruder, screw kneading device and the like. After the powder coatings have been prepared they are adjusted to the desired particle size distribution by grinding and, if appropriate, by classifying and seiving.

The powder coatings are applied electrostatically or triboelectrostatically to the preheated metal pipe surface.

The invention therefore also relates to a process for the exterior coating of metal pipes using the above-described powder coatings. In this process the metal pipe surface is first usually cleaned to remove rust, fat, oil, dust etc. If desired, a chemical pretreatment (chromatizing and/or phosphatizing) is carried out. Subsequently, the cleaned metal pipes are heated by inductive heating or in a gas oven to a coating temperature of from approximately 170 to 250° C. The powder coatings according to the invention are applied to the hot surface of the metal pipe by electrostatic means or by triboelectrification. The conventional thicknesses in which the powder coating is applied are in the range from 100 to 1000 $\mu$m, preferably within the range from 300 to 500 $\mu$m.

The powder coatings are cured within a few minutes.

The present invention furthermore relates to the use of the above-described powder coatings for the exterior coating of metal pipes.

The coated metal pipes which can be obtained by the process according to the invention exhibit outstanding properties. For instance, there is no delamination of the powder coating from the substrate. The resistance to hot water of the powder coatings obtained is excellent, and the results of the CD test, which tests the resistance of the powder coating with respect to cathodic delamination in accordance with DIN 30671, are outstanding.

In the text below, the invention is illustrated in more detail using examples. In these examples parts are by weight unless otherwise indicated.

Powder coatings are prepared having the following composition:

|  | Example 1 | Comparison Example 1 | Comparison Example 2 |
|---|---|---|---|
| Pigment (parts by weight) | 2.0 | 2.0 | 2.0 |
| Blanc finxe-N [sic] (parts by weight) | — | 19.0 | — |
| Minex 4 (parts by weight) | — | — | 19.0 |
| Silbond 6000 EST (crystalline silicic acid functionalized with glycidyl groups) (parts by weight) | 19.0 | — | — |
| Additives (parts by weight) | 1.66 | 1.66 | 1.66 |
| Catalyst, EPON P104 from Shell (parts by weight) | 0.5 | 0.5 | 0.5 |
| Phenolic crosslinking agent, XD 8062 from Dow (parts by weight) | 13.8 | 13.8 | 13.8 |
| Epoxy resin, trade designation DER 664U from Dow | 31.0 | 31.0 | 31.0 |
| Novolak resin, trade designation DER 672U from Dow | 32.0 | 32.0 | 32.0 |
| Aerosil R 972 from Degussa as flow aid | 0.04 | 0.04 | 0.04 |

The powder coatings of Example 1 and of Comparison Examples 1 and 2 are processed to give powder coatings of standard commercial particle-size distribution.

The powder coatings prepared are employed in the one-layer process for the exterior coating of metal pipes. For this purpose, pipes of diameter 300 mm with a wall thickness of 12 mm are blasted in a blasting unit to degree of cleanness SA 3. The peak-to-valley height should be about 50 $\mu$m. The pipes are then heated to 230±5° C. using an induction coil. The powder coatings of Example 1 and of Comparison Examples 1 and 2 are applied electrostatically at a coat thickness of approximately 100 $\mu$m and are cured.

The test results are compiled below.

|  | Example 1 | Comparison Example 1 | Comparison Example 2 |
|---|---|---|---|
| Gel time[1] 180° C. | 59 sec | 56 sec | 58 sec |
| Indentation and[2] Flexure (table edge) on 0.5 mm steel panel, 10' 180° C. | 8.0 + | 7.9 + | 8.3 + |
| Coat thickness ($\mu$m) | 60–70 | 80–90 | 80–90 |
| Gloss 60° | 87 E | 90 E | 75 E |
| Flow 10' 180° C. | moderate | moderate | moderate |
| Flexure[3] |  |  |  |
| RT | 32 mm | 12 mm | 15 mm |
|  | 32 mm | 10 mm | 13 mm |
| approx. 0° | 18 mm | 6 mm | 11 mm |
|  | 18 mm | 7 mm | 10 mm |

[1]: determined using Coesfeld gel time instrument
[2]: 0 = cracks; * = hairline cracks; + = satisfactory
[3]: on 5 mm panel blasted with Wheelabrator GH 40, SA 2.5 Preheated at 240° C., coated, after-baked at 240° C. for 120 sec and immediately cooled in water: coat thickness 400–500 $\mu$m. The higher the flexure values, the higher the flexibility.

Impact on 10 mm panel blasted with Wheelabrator GH 40, SA 2.5, preheated at 240° C., coated, after-baked at 240° C. for 120 sec. and immediately cooled in water:

| | Example 1 | | Comparison Example 1 | | Comparison Example 2 | |
|---|---|---|---|---|---|---|
| | Layer thickness lm | Imp.[1] kg*cm | Layer thickness lm | Imp.[1] kg*cm | Layer thickness lm | Imp.[1] kg*cm |
| Point 1 | 550 | (60) | 670 | (50) | 540 | (50) |
| Point 2 | 570 | 55 | 660 | (45) | 560 | 40 |
| Point 3 | 570 | (60) | 660 | (40) | 560 | 45 |
| Point 4 | 610 | 55 | 670 | 35 | 570 | (50) |
| Point 5 | 550 | (55) | 650 | (40) | 540 | 45 |
| Point 6 | 600 | 55 | 640 | 35 | 610 | 50 |
| Point 7 | 550 | (60) | 600 | (35) | 520 | 50 |
| Point 8 | 600 | 55 | 600 | 35 | 540 | (55) |

Impact values without ( ) = satisfactory, with no destruction of the film.
Impact values with ( ) = not satisfactory, with destruction of the film occurring
[1] The value given indicates the product of the weight of the falling element (kg) and of the height of fall (cm).

Storage in water at 80° C. in mains water on 5 mm panel blasted with Wheelabrator GE 40, SA 2.5, immersed in 10% strength by volume Basomat PT, preheated at 240° C., coated, after-baked at 240° C. for 120 sec. and immediately cooled in water. Coat thickness: 400–500 μm

| | Example 1 | | Comparison Example 1 | | Comparison Example 2 | |
|---|---|---|---|---|---|---|
| | Hot | Cold | Hot | Cold | Hot | Cold |
| No exposure | | + | | * | | * |
| 168 hours | + | + | – | * | – | –– |
| 336 hours | + | + | – | * | – | – |
| 504 hours | + | + | – | * | – | – 3t12vpsbl |
| 672 hours | + | + | – | – | – | – |
| 840 hours | +/* | + | */– | */– | – | –– |
| 1008 hours | +/* | +/* | – | – | – | –– |

++ = very good, + = good, * = moderate, – = poor, –– = very poor

CD test on 10 mm panels blasted with Wheelabrator GH 40, SA 2.5, immersed in 10% strength by volume Basomat PT, preheated at 240° C., coated, after-baked at 240° C. for 120 sec. and immediately cooled in water. Coat thickness: 400–500 μm

| Submigration after | Example 1 | Comparison Example 1 | Comparison Example 2 |
|---|---|---|---|
| 30 days RT | 0–1 mm | x | x |
| 2 days 65° C. | 0 mm | x | x |
| 14 days 65° C. | 1 mm | x | x | x = poor adhesion, therefore not possible to determine submigration.

Storage in water of the free film at 80° C. in mains water: Coat thickness: 400–500 μm

| Water uptake after | Example 1 | Comparison Example 1 | Comparison Example 2 |
|---|---|---|---|
| 240 hours | 5.20% | 8.14% | 6.01% |
| 504 hours | 5.86% | 9.89% | 8.82% |
| 744 hours | 6.21% | 11.06% | 9.28% |
| 1008 hours | 7.05% | 12.22% | 10.58% |

We claim:

1. Powder coating comprising epoxy resin selected from the group consisting of epoxidized bisphenol A, epoxidized bisphenol F, epoxidized novolak resins and mixtures thereof, phenolic crosslinking agents having methylol functionality, wherein the epoxy resins and phenolic crosslinking agents are employed in a ratio such the ratio of epoxide groups to phenolic groups is about 1:1, catalysts, and fillers comprising crystalline silicates functionalized with glycidyl groups present in an amount from 10 to 40% by weight, based on the total weight of the powder coating and wherein said coatings are resistant to corrosion, hot water and cathodic delamination.

2. Powder coating according to claim 1, wherein the epoxy resin is an epoxidized novolak resins having an average functionality in the range from 2.4 to 2.8 and with an epoxide equivalent weight in the range from 600 to 850.

3. Powder coating according to claim 1, characterized in that the phenolic crosslinking agents used are selected from the group consisting of hydroxyl group-containing bisphenol A phenolic resins and hydroxyl group containing bisphenol F phenolic resins having a hydroxyl equivalent weight in the range from 180 to 600.

4. A process for improving resistance of metal pipes to corrosion, hot water and cathodic delamination, comprising, applying to metal pipe, a single-layer exterior coating of a powder coating according to claim 1.

5. Metal pipe exterior coating comprising a powder coating according to claim 1.

6. A powder coating comprising epoxy resin selected from the group consisting of epoxidized bisphenol A, epoxidized bisphenol F, epoxidized novolak resins and mixtures thereof, phenolic crosslinking agent having methylol functionality, wherein the epoxy resins and phenolic crosslinking agents are employed in a ratio such the the ratio of epoxide groups to phenolic groups is about 1:1, catalysts in an amount of from 0.001 to 10% by weight, based on the total weight of the epoxy resin and the phenolic crosslinking agent, and fillers comprising crystalline silicates functionalized with glycidyl groups present in an amount from 10 to 40% by weight, based on the total weight of the powder coating, said powder coatings being resistant to corrosion, hot water and cathodic delamination.

* * * * *